US008811563B2

(12) United States Patent
Yeager et al.

(10) Patent No.: US 8,811,563 B2
(45) Date of Patent: Aug. 19, 2014

(54) METHOD AND SYSTEM FOR ASSESSING FAILURES OF FUEL RODS

(75) Inventors: Harold Yeager, Wilmington, NC (US); Russell Stachowski, Wilmington, NC (US); Charles McNeely, Wilmington, NC (US); Gerald Potts, Wilmington, NC (US); Anthony Reese, Wilmington, NC (US); Robert Rand, Wilmington, NC (US); Robert Schneider, Wilmington, NC (US); Angelo Chopelas, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 2523 days.

(21) Appl. No.: 11/024,432

(22) Filed: Dec. 30, 2004

(65) Prior Publication Data
US 2006/0146973 A1    Jul. 6, 2006

(51) Int. Cl.
*G21C 17/00*    (2006.01)

(52) U.S. Cl.
USPC ............................ 376/251; 376/250; 376/277

(58) Field of Classification Search
USPC ......... 376/251, 217, 219, 250, 252, 253, 259, 376/277
See application file for complete search history.

(56) References Cited

U.S. PATENT DOCUMENTS

| 3,786,257 A * | 1/1974 | Weiss et al. ................... 376/253 |
| 4,079,620 A | 3/1978 | Jester et al. |
| 4,126,514 A | 11/1978 | Wonn |
| 4,384,489 A | 5/1983 | Crutzen et al. |
| 4,415,524 A | 11/1983 | Gross et al. |
| 4,764,335 A | 8/1988 | Gross et al. |
| 4,774,049 A * | 9/1988 | Impink et al. ................. 376/245 |
| 5,317,606 A * | 5/1994 | Kinoshita et al. ............. 376/217 |
| 5,392,320 A * | 2/1995 | Chao .............................. 376/215 |
| 5,528,639 A * | 6/1996 | Eckert et al. ................... 376/216 |
| 5,537,450 A * | 7/1996 | Asay et al. ..................... 376/253 |
| 5,912,933 A * | 6/1999 | Shaug et al. ................... 376/216 |
| 6,061,412 A * | 5/2000 | Stucker et al. ................. 376/217 |

(Continued)

FOREIGN PATENT DOCUMENTS

| EP | 1 443 523 | 8/2004 |
| FR | 2535100 A1 | 4/1984 |

(Continued)

OTHER PUBLICATIONS

Schultz, Control of Nuclear Reactors and Power Plants, McGraw-Hiull Book Company, Inc. copyright 1961, pp. 406, 407, 412, 413, 417, 418, 423-427.*
Lewis, Nuclear Power Reactor Safety, John Wiley & Sons, Inc., copyright 1977, pp. 72, 73, 79, 82, 84, 85, 98, 99, 102, 105-107, 176-178, 292-305.*
Nishida et al. "Critical power prediction method for core thermal-hydraulic evaluation based on liquid film flow model", Journal of Nuclear science and Technology, 31 (4), pp. 352-354, (1994).*

(Continued)

*Primary Examiner* — James Trammell
*Assistant Examiner* — Daniel L Greene
(74) *Attorney, Agent, or Firm* — Harness, Dickey & Pierce, PLC

(57) ABSTRACT

A system and method for assessing failure of fuel rods are disclosed. The method may include monitoring fuel rod operational conditions, comparing the fuel rod parameters to parameters limits, calculating the fuel rod performance parameters to determine the likelihood of failure of individual fuel rods, and updating plant operating parameters based on the calculated fuel rod parameters. The system may input the calculated fuel rod parameters into a fuel failure model to assess the probability of failure, and predict the probability of failure of individual fuel rods based on fuel rod parameters in the fuel failure model.

8 Claims, 3 Drawing Sheets

(56) References Cited

U.S. PATENT DOCUMENTS

| | | | |
|---|---|---|---|
| 6,345,081 B1 * | 2/2002 | Sihver et al. | 376/245 |
| 6,553,090 B2 * | 4/2003 | Fukasawa | 376/216 |
| 6,697,447 B1 * | 2/2004 | Casillas et al. | 376/245 |
| 6,721,383 B2 * | 4/2004 | Casillas et al. | 376/245 |
| 7,693,249 B2 | 4/2010 | Kropaczek et al. | |

FOREIGN PATENT DOCUMENTS

| | | | |
|---|---|---|---|
| JP | 59-007295 | | 1/1984 |
| JP | 60-165593 | | 8/1985 |
| JP | 61-041991 | | 2/1986 |
| JP | 03220498 A | * | 9/1991 |
| JP | 04-168398 | | 6/1992 |
| JP | 2002-048891 | | 2/2002 |
| JP | 2004-233363 | | 8/2004 |

OTHER PUBLICATIONS

Ujita et al. "Severe Accident Analysis Code SAMPSON Improvement for IMPACT Project" (2002), JSME International Jounral, Series B, vol. 45, No. 3, 2002, available online @ http://nels.nii.ac.jp/els/110003479082.pdf?id=ART0003992714&type=pdf&lang=en&host=cinii&order_no =&ppv_type=0&lang_sw=&no=1258903908&cp=, last accessed Nov. 22, 2009.*

IEEE Std 603-1998, IEEE Standard Criteria for Safety Systems for Nuclear Power Generating Stations, pp. 1-39, 19980701.*

IEEE Std 603-1991, IEEE Standard Criteria for Safety Systems for Nuclear Power Generating Statio, pp. 1-31. 19910627.*

US NRC, Regulatory Guide 1.118 Periodic Testing of Electric Power and Protection Systems, pp. 1-4.*

Spanish Office Action dated Jan. 28, 2008.

Office Action dated Feb. 14, 2012 issued in corresponding Japanese Application No. 2005-367368 and English translation thereof.

* cited by examiner

METHOD AND SYSTEM FOR ASSESSING FAILURES OF FUEL RODS

BACKGROUND OF THE INVENTION

1. Field of the Invention

The present invention relates generally to assessing failures of fuel rods, particularly in a core of a nuclear reactor.

2. Description of the Related Art

Fuel assemblies, such as in a nuclear core reactor, are essential nuclear components regarding the operation and safety of a plant. Fuel assemblies typically each provide a plurality of vertically upstanding fuel rods. Accordingly, recent experience in the nuclear industry is to increase fuel assembly output power, discharge exposure and cycle length as much as possible. As a result, this raises the question of fuel rod integrity and radioactivity release, especially during operational power maneuvers. Thus, monitoring of fuel rods to determine when certain operating conditions exceed acceptable tolerance levels may be crucial in a nuclear reactor. The failure of a single fuel rod in a reactor may result in the total failure of the reactor's ability to continue normal operation which may instigate the temporary shutdown of a facility or plant. A typical failure can be related to duty (i.e., hoop stress) applied on the fuel rods caused by power increases. This duty may typically occur suddenly, such as during a single power maneuver of the reactor, or may be the result of cycle loading through multiple power increases and decreases on a given fuel rod. Further, the fuel assemblies typically will have to be repaired (i.e., by replacing fuel rods within the failed assembly) or replaced, adding to the shutdown time and associated cost. Procedures for maintaining fuel rods within fundamental safety criteria may include providing statistical/empirical evidence showing that the fuel rods in a reactor may function within a given margin of safety at or below some predetermined power level, which are intended to keep the thermal and mechanical stresses on the fuel rod cladding for all rods in the reactor core at a safe level during the life and use of the fuel (e.g., to prevent any cracking or ruptures of fuel rod cladding and subsequent leaking of contaminates). Reactor operating limits are established to ensure that reactor operation is maintained within a fuel rod thermal-mechanical design and safety analysis basis. These operating limits may be defined, for example, by the maximum allowable fuel pellet operating power as a function of fuel pellet exposure level—usually expressed in terms of the maximum linear heat generation rate (i.e., MLHGR, the maximum heat generated by a fuel rod per unit length of the rod) or change in MLHGR versus exposure or time. Direct monitoring of the fuel rod operation and subsequent calculation of fuel rod performance parameters allows for the determination of appropriate operational strategy to maintain the useful life of the fuel rods. However, current monitoring techniques are limited to the setting on the output power levels of any rod (or more locally the fuel pellets) based on an a priori assumed set of operational conditions for the fuel rod. This fuel rod output power limit is then applied regardless of the actual operational history resulting in either excess conservatism and/or an incomplete assessment of a fuel rod's margin of safety.

In large facilities, for example, a nuclear power plant, monitoring the fuel rod parameters for all fuel rods may be a complex and time consuming process (e.g., a reactor typically may have approximately 60,000 fuel rods). For example, plant personnel may be required to record, analyze, interpret, determine trends, and maintain operating condition data on the rods to ensure proper operation. It may be known to determine parameters of fuel rods, such as hoop stress, internal pressure, temperature, and fission gas release while working off-line during power shut-down. However, the determination of these rod parameters may be generally determined only after the failure had occurred. Accordingly, without knowledge of these fuel rod parameters before or during a reactor power maneuver, the characteristics of the fuel rods cannot be accounted for in the operating strategies to reduce the probability of failure. Furthermore, if a fuel rod fails, the internal environment of the fuel rod may change substantially from a normal operating fuel rod. As such, once a fuel rod has failed, the potential for the failure to worsen in extent (degradation) may become the paramount concern in operating the core until the failed fuel can be discharged because hydriding and other mechanisms resulting from loss of cladding integrity may result in failed fuel rods having much less resistance to further damage. Accordingly, models that determine the behavior of failed fuel rods are different than those that apply to normal fuel rods.

SUMMARY OF THE INVENTION

Accordingly, exemplary embodiments of the present invention may provide systems and methods for assessing the fuel rod parameters relative to the risk of fuel rod failure for the potential to increase energy output, improve plant performance and fuel efficiency.

One exemplary embodiment according to the systems and methods of the invention may include monitoring fuel rod operational condition and calculating the fuel rod parameters to determine risk of failure of individual fuel rods (so-called monitoring of fuel rod parameters), comparing the calculated fuel rod parameters to parameter limits, and updating plant operating parameters based on the calculated fuel rod parameters.

Other exemplary embodiments of the systems and methods of the invention separately provide monitoring the fuel rod parameters in real-time.

Other exemplary embodiments of the systems and methods of the invention separately provide a routine monitoring of the fuel rod parameters. In yet a further exemplary embodiment, the routine monitoring may be performed every one hour.

Other exemplary embodiments of the systems and methods of the invention separately provide automatically monitoring the fuel rod parameters without an operator. In yet a further exemplary embodiment, the monitoring of the fuel rod parameters may be performed by an operator.

Other exemplary embodiments of the systems and methods of the invention separately provide monitoring the fuel rod parameters by at least one of a plant computer, a core monitoring system and a computer that may not be linked to the plant computer.

Other exemplary embodiments of the systems and methods of the invention separately provide monitoring the fuel rod parameters through an Internet.

Other exemplary embodiments of the systems and methods of the invention separately provide notifying an operator if the compared fuel rod parameters are greater than the parameter limits. In yet a further exemplary embodiment, the comparison of the fuel rod parameters may be with previously monitored other parameters that resulted in successful operation.

Other exemplary embodiments of the systems and methods of the invention separately provide modifying projected plant operations to re-calculate the fuel rod parameters.

Other exemplary embodiments of the systems and methods of the invention separately provide the fuel rod parameters may be at least one of stress, internal gas pressure, temperature, deformation, release of fission product gases, fuel swelling and densification, cladding thermal expansion, and cladding corrosion.

Another exemplary embodiment according to the systems and methods of the invention may include monitoring fuel rod parameters, inputting projected operating maneuvers and conditions to generate a predicted fuel rod performance parameters, calculating the fuel rod parameters to determine the potential of individual fuel rods to fail and comparing the calculated fuel rod parameters to parameter limits, and updating plant operating parameters based on the calculated fuel rod parameters.

Other exemplary embodiments of the systems and methods of the invention separately provide inputting the projected operating maneuvers may be performed before a power maneuver operation.

Other exemplary embodiments of the systems and methods of the invention separately provide calculating the fuel rod parameters may be based on manually specified calculations directed to a subset of the fuel rods.

Other exemplary embodiments of the systems and methods of the invention separately provide the subset of fuel rods may be all of the unique rod locations in a bundle, excluding the symmetric rods within the bundle. In yet a further exemplary embodiment, the subset of fuel rods may be near a recent control blade movement.

Other exemplary embodiments of the systems and methods of the invention separately provide calculating the fuel rod parameters based on algorithms which identify the fuel rods that are more likely to be subject to failure.

Other exemplary embodiments of the systems and methods of the invention separately provide modifying projected plant operations by inputting different projected plant operational conditions.

Another exemplary embodiment according to the systems and methods of the invention may include monitoring fuel rod operational condition, inputting projected operating maneuvers and conditions to generate predicted fuel rod performance parameters, calculating the fuel rod parameters to determine the likelihood of the failure of individual fuel rods and comparing the calculated fuel rod parameters to parameter limits, calculating the failed fuel rod parameters and comparing failed fuel rod parameters to failed fuel rod limits, and updating plant operating parameters based on the calculated fuel rod parameters and calculated failed fuel rod parameters.

Exemplary embodiments of the present invention may input the parameters into models to help assess the risk of degradation of a failed fuel rod. For example, determination of stress on the fuel rods may be inputted to a failed fuel model which may help assess the probability of degradation.

Exemplary embodiments of the present invention may be available to assess the fuel rod parameters as part of a normal part of evaluation and optimization for planned or unplanned power maneuvers.

Exemplary embodiments of the present invention may reduce and/or prevent fuel rod degradation and future failures, with knowledge of failed fuel rod parameters.

These and other features and advantages of this invention are described in, or are apparent from, the following detailed description of various exemplary embodiments of the systems and methods according to this invention.

BRIEF DESCRIPTION OF THE DRAWINGS

Exemplary embodiments of the present invention will be readily understood with reference to the following detailed description thereof provided in conjunction with the attached drawings in which.

DETAILED DESCRIPTION OF EXEMPLARY EMBODIMENTS

Figure 1:
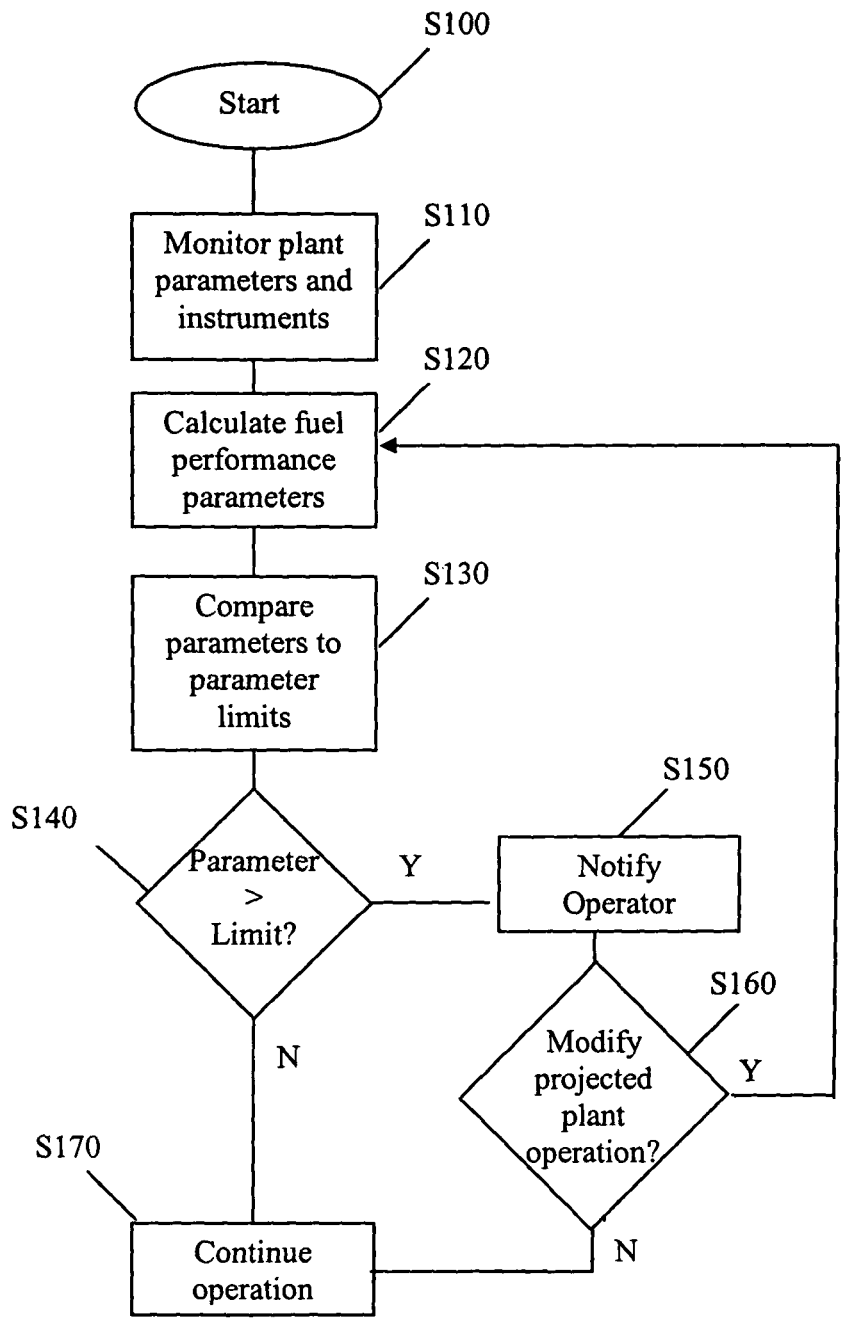
FIG. 1 is a flowchart of a monitoring mode according to an exemplary embodiment of the present invention.

The following description and exemplary embodiments are merely exemplary in nature and is in no way intended to limit the invention, its application, or uses. Although the present invention is described in connection with a nuclear power plant, it will be appreciated that the present invention may be described in connection with any type of nuclear reactors, such as, for example, boiling water reactor (BWR), pressurized water reactor (PWR) and light water reactors (LWR) that require fuel rods as fuel elements.

Although the present invention addresses the problem associated with fuel rod cladding mid-plane hoop stress which is referred to as "fuel rod parameters", it should be understood that fuel rod parameters may refer to, for example, but not limited to, fuel rod internal gas pressure, other fuel rod cladding stresses, fuel and cladding temperature, fuel and cladding deformation, release of fission product gases, fuel swelling and densification, cladding thermal expansion, and cladding corrosion. It should further be appreciated that the above list is not exclusive and the calculated parameters may be associated with other fuel rod characteristics.

Accordingly, exemplary embodiments of the present invention may provide systems and methods for assessing the fuel rod parameters relative to the risk of fuel rod failure for the potential to increase energy output, improve plant performance and fuel efficiency.

Exemplary embodiments of the present invention may provide a system linked to a plant computer that may routinely and automatically monitor (e.g., nodal powers/exposures, void histories, void fraction, and control state, etc.) fuel rod bundles to collect data. The system may then use the collected data to calculate and update the fuel rod parameters (e.g., clad hoop stress) as a function of time/exposure (based on actual operating history). The calculations may be performed by a thermal-mechanical computer code. The necessary data for calculation of fuel performance parameters may be stored temporarily or from the beginning to the end of a fuel rod's discharge. The parameter may be calculated and displayed in various ways (e.g., highest stress or highest delta stress), as needed. Further, the stress parameter (or other relevant thermal-mechanical parameters) may be inputted to a fuel failure model, for example, a damage index, to provide another level of assessment of the probability of fuel failure in the current and/or future reactor power maneuver. For example, when a power maneuver is to be performed (predictor mode), predictor cases may be operated before the power maneuver so that predicted stresses can be calculated based on the predicted bundle/rod powers in the power maneuver. Alternatively, if the predictor cases are not required/requested, then the fuel rod stresses may be calculated normally based on the actual fuel rod powers (monitoring mode). It should be appreciated that the predicted calculations may be calculated by limiting the calculations to a subset of rods that may be manually specified or based on algorithms which may identify the fuel rods more likely to be subjected to higher stress.

An exemplary embodiment according to the systems and methods of the invention may be during a monitoring mode.

The monitoring mode may include monitoring a reactor's condition, state and/or instrumentation, accumulating the reactor operational histories, calculating the fuel rod performance parameters to determine the margin to failure of individual fuel rods, and providing information to plant operators in order that they may update plant operating conditions based on the calculated fuel rod parameters. The monitoring mode may be considered the normal mode or mode that is operating consistently.

Another exemplary embodiment according to the systems and methods of the invention may be during a predictor mode. During the predictor mode, the plant operating history may also be monitored while operating the system. The plant operating history may serve as the basis for predictions. Further, an operating maneuver may be performed during the predictor mode. The proposed operating maneuver may be inputted into the system and a predicted set of fuel rod performance parameters may be calculated, before the operating maneuver may be actually made. The new parameters may then be assessed and compared to the limits and/or trends. Accordingly, the operator may make a judgment as to whether to proceed with the projected operating maneuver. By performing predictions using different operating strategies and/or power plant maneuvering strategies, it would be possible to choose the optimum strategy with the consideration of fuel rod performance parameters that may, in fact, prevent fuel rod failures.

Another exemplary embodiment according to the systems and methods of the invention may be to use the normal mode of the system when the plant has an indication, through, for example, the off-gas monitoring system, that a fuel rod failure has occurred. The system, which may have been monitoring the plant operating history may calculate fuel rod performance parameters for all rods and may determine the highest risk rods in terms of duty related failure. The information obtained may then be used to guide operators in making plant operating maneuvers to predict the location of the defective fuel rod. This may be used in conjunction with other mechanisms to define the failed fuel rod, such as power suppression testing to confirm the prediction of the failed fuel rods.

Another exemplary embodiment according to the systems and methods of the invention may be during a failed fuel management mode. This mode may be invoked after the plant has an indication, through, for example, the off-gas monitoring system that a fuel rod failure has occurred and after the area in which the failure is located has been determined by the performance of power suppression testing. The system, which has been monitoring the plant operating history or supplied with the histories in an off-line manner, may calculate fuel rod performance parameters. It should be appreciated that the calculated fuel rod performance parameters may pertain to failed rods that the operator has considered to have failed and may include the time of failure. The calculations may then include specific models for failed fuel rods since the altered environment causes a change in the models required to assess the failed fuel rod performance. This information could be used to more effectively manage the operation of the plant with the failed rod still present in the core. This management of the failed rod may reduce or prevent the condition of the fuel rods from degrading.

FIG. 1 is a flowchart of a monitoring mode according to an exemplary embodiment of the present invention. As shown in FIG. 1, the operation begins at S100 and proceeds to S110 in which the operation monitors plant parameters and instrumentations. It should be appreciated that in S110, the monitoring may be in real-time. Next, in S120, the operation calculates fuel performance parameters to determine the margin of failure of individual fuel rods. With the calculated fuel rod parameters, the operation proceeds to S130 to compare the calculated parameters to parameter limits. The operation then makes a determination in S140 to determine whether the calculated fuel rod parameters are greater or less than the parameter limits. If the calculated parameters are less than the parameter limit, then the operation proceeds to S170 so that the operation continues in the monitoring mode. If, however, the calculated parameters are greater than the parameter limits, then the operation proceeds to S150 and notifies the operator to update the plant operation conditions based on the calculated fuel rod parameters. Then in S160, the operator may modify the projected plant operation so that the calculated parameters may be within the parameter limits. To calculate the fuel rod parameters within the limits, the operation may proceed to S120 and re-calculate the fuel performance parameters.

In S110 and S120, the operation may be monitored in a routine manner. As an exemplary embodiment, the monitoring of the fuel rods can be performed during every instance of a core monitor case to provide an accurate assessment of the risk of rod(s) failure or degradation. As an exemplary embodiment, the monitoring may be performed every one hour. It should be appreciated that the monitoring performance may be designated with less or more frequency based on the accuracy needed for the assessment.

In S110 and S120, the operation may also be automatically monitored without an operator. For example, the operation may be implemented on any programmed general purpose computer, such as a programmed microprocessor or microcontroller and peripheral integrated circuit elements, an application-specific integrated circuit (ASIC) or other integrated circuit, a digital signal processor, a hardwired electronic or logic circuit such as a discrete element circuit, and a programmable logic device. In general, any device, capable of implementing a finite state machine that is in turn capable of implementing the above operation.

It should also be appreciated that S110 and S120 can be available via wide area network (WAN) or local area network (LAN), the intranet, the Internet or other electronic media or any other distributed processing network so as to access the operation by remote location. In addition, it should be appreciated that S110 may be available via WAN and/or LAN, and S120 may be performed remotely. It should be appreciated that the operation can be provided with a protected operation or other encryption operation.

In S130, the calculated fuel rod parameters may be compared to parameter limits. The calculated fuel rod parameters may be based on actual rod power histories. The parameter limits may also be based on the fuel rod parameters during a condition of the fuel rods in a normal steady-state condition so as to compare the actual rod power with previously normal conditions. If the operation in S130 discloses a violation of the parameter limits as set (S140), then there may be an increased risk of fuel rod failure that must be notified to the operator (S150), so that appropriate actions, if any, can be taken as in S160, or operation continued as is, as in S170.

It should be appreciated that an operator may set the parameter limits to other desirable values, (e.g., a lower limit than otherwise considered acceptable normal levels) besides the levels at which fuel rod failure is considered likely.

The determination of the fuel rod parameter limits may be based on actual rod power histories. The actual rod power histories may be calculated in real-time which is a function of time and/or exposure. The calculation may be performed by a thermal mechanical code. These computer programs are used to calculate the thermal/mechanical response of nuclear fuel rods to time varying power histories. Calculated response parameters may include at least one of fuel centerline temperature, fission gas release, rod internal pressure, and cladding stress, strain and deformation, including local stress and strain. The data for calculation of fuel performance parameters, such as, but not limited to, stress may be stored from beginning to the end of fuel assembly discharge (e.g., the fuel rod parameters may be shuffled with the bundles at refueling outages). The stress may then be calculated and variously displayed (e.g., highest stress, highest delta stress, etc.) as needed.

Figure 2:
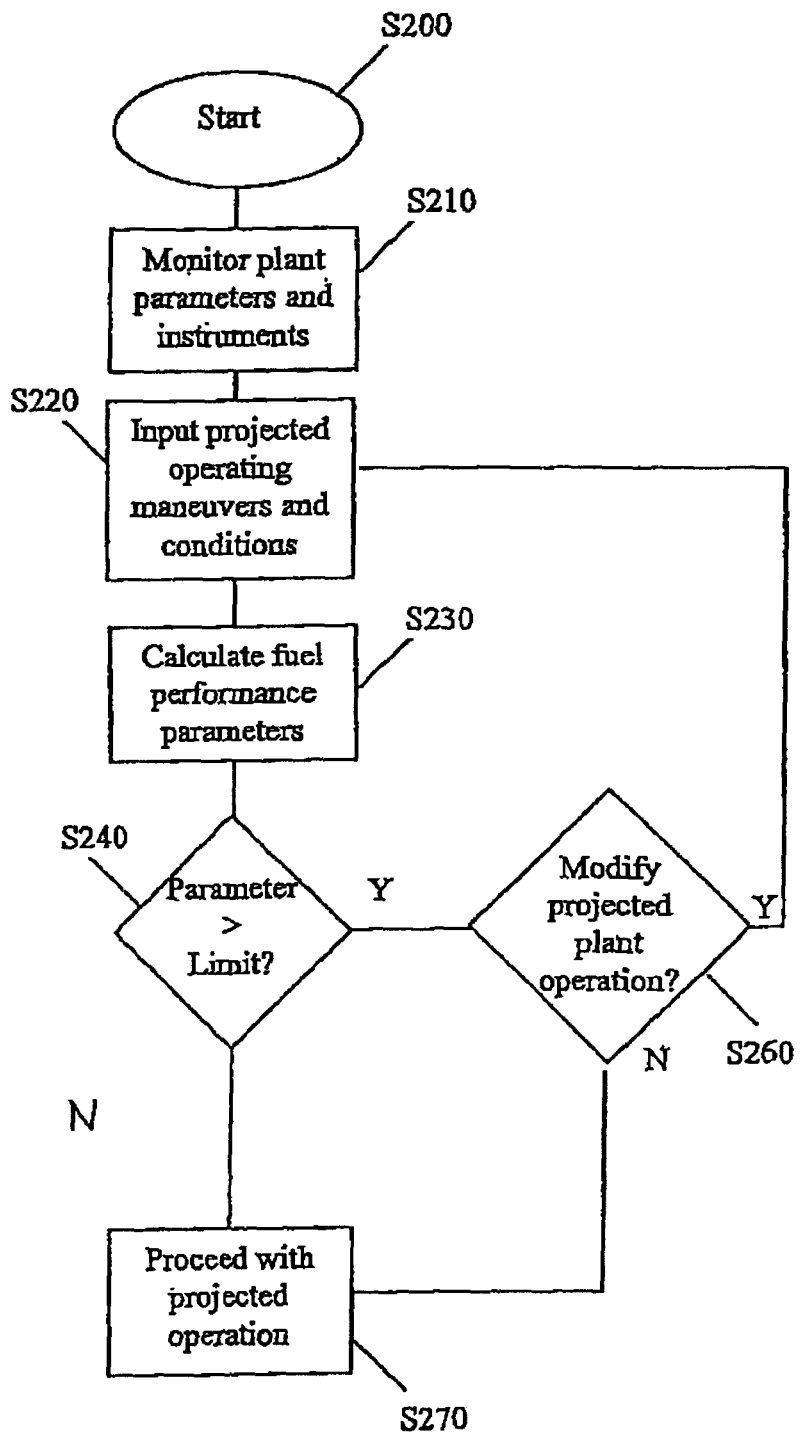
FIG. 2 is a flowchart of a predictor mode according to an exemplary embodiment of present invention.

FIG. 2 is a flowchart of a predictor mode according to an exemplary embodiment of present invention. The predictor mode provides another level of assessment of the probability of failure in the current or future reactor power maneuvers. As shown in FIG. 2, the operation begins at S200 and proceeds to S210 in which the operation monitors plant parameters and instrumentation. It should be appreciated that in S210, the monitoring may be in real-time. The predictor mode may operate during a power maneuver so as to input projected operating maneuvers and conditions. It should be understood that the monitored plant parameters and instrumentations may provide a plant operating history which may serve as a basis for predictions. In S220, before a power maneuver is performed, the projected operating maneuvers and/or condition may be inputted into the operating system so that a predicted set of fuel rod performance parameters may be calculated. The inputted projected operation maneuver may be a fuel failure model (i.e., damage index) to provide another level of assessment of the probability of failure in the current or future reactor power maneuvers. In S230, the operation calculates fuel performance parameters to determine the margin of failure of individual fuel rods. With the calculated fuel rod parameters, the operation may compare the calculated parameters to parameter limits. The operation then makes a determination in S240 to determine whether the calculated fuel rod parameters are greater or less than the parameter limits. If the calculated parameters are less than the parameter limit, then the operation proceeds to S270 so that the operation may proceed with the projected operation. If, however, the calculated parameters are greater than the parameter limits, then the operation proceeds to S260 so as to notify the operator to modify the projected plant operation. The calculated fuel rod parameters are compared to the parameter limits and/or trends so that the operator may make a decision whether to proceed with the projected operating maneuver.

In the predictor mode, the operation may determine whether a power maneuver is needed so that future operating or maneuver strategies may be assessed. The predictor mode may be used during normal plant operation, during a power maneuver, plant shut-down, reactor core maintenance, any related maintenance procedures, or off-line.

During the power maneuver, calculated predictions may be provided in a timely fashion as manually specified by the operator. Alternatively, the predicted calculations may also be based on an algorithm which identifies the rods more likely to be subjected to a higher stress or risk of failure. The calculations may be performed by a computer not associated with the plant monitoring by routinely updating the plant operating parameters so that the actual fuel rod history is included in the model. Due to the large number of fuel rods in a reactor, typically 60,000 rods, it may be likely that not all of the fuel rod stresses could be calculated in a sufficiently short time to allow analyses to optimize the power maneuver. Therefore, some subset of all the rods in the core might be calculated, such as only one-half of the rods in the bundle. It should be appreciated that priority may be given to calculations for fuel rods that are near the recent control blade movement of the core.

It should be appreciated that monitoring the fuel rod parameters in the fuel failure model may be automatically or routinely obtained by a plant core computer.

It should further be appreciated that monitoring the fuel rod parameters in the fuel failure model may be remotely accessed via on-line (e.g., web-access) or any other electronic media.

It will be appreciated that the predicted calculations could be performed by a computer not associated with the plant monitoring by routinely updating the plant operating parameters so that the actual fuel rod history is modeled.

It should be appreciated that due to the large number of fuel rods in a reactor, (e.g., approximately 60,000), it may be likely that not all of the fuel rod failures could be calculated in a relatively short time to allow for optimization analysis. Accordingly, it will be appreciated that only a subset of rods in the bundle core may be calculated, for example, only one-half of all the rods in the bundle.

It should further be appreciated that the calculated subset of rods may provide priority to the rods near the control blade movement.

It should further be appreciated that the predictive mode may also prove useful in the event of a fuel failure in predicting where in the core a failure might likely exist (i.e., highest stressed rod or rod with highest damage index).

Figure 3:
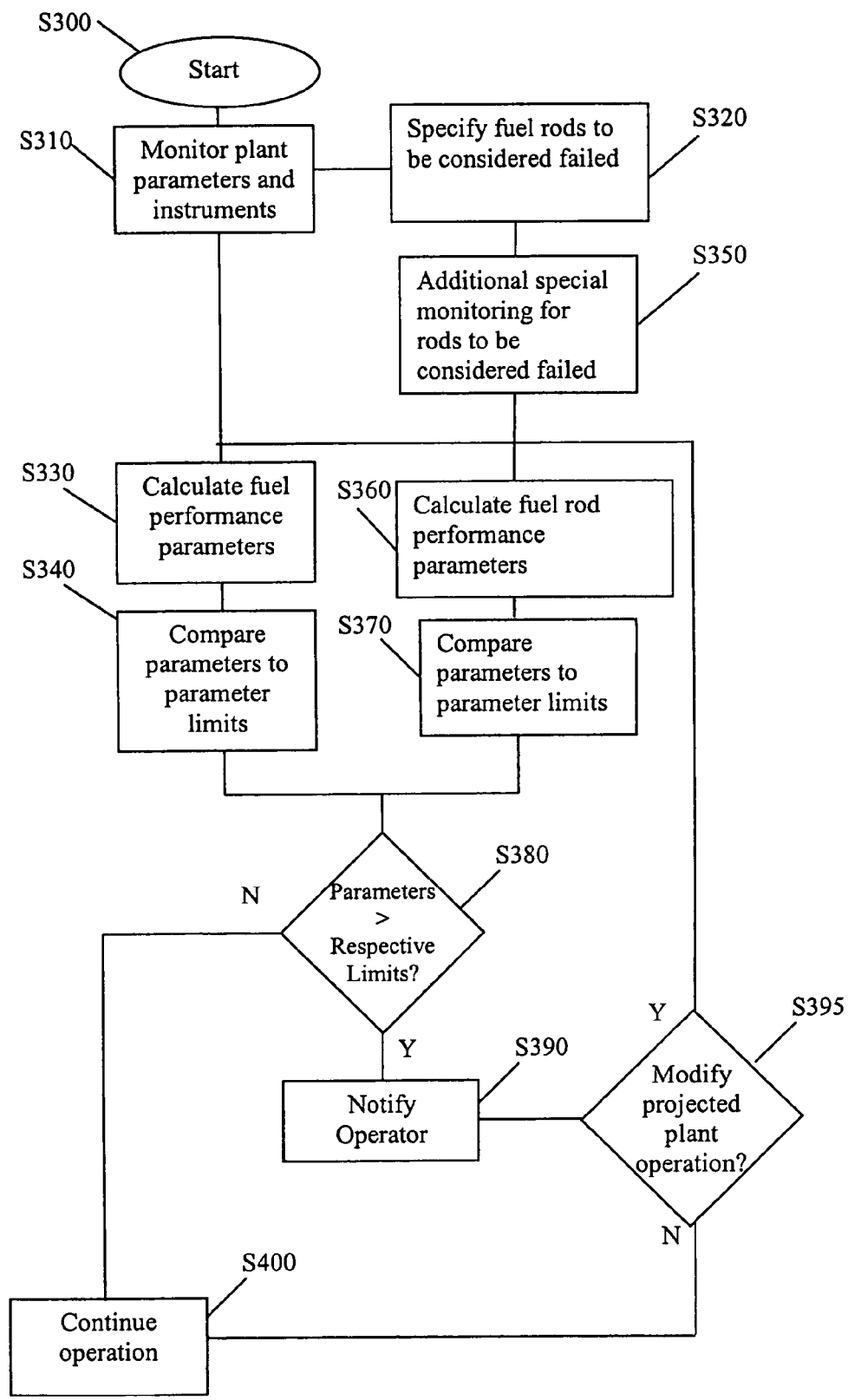
FIG. 3 is a flowchart of a failed fuel management mode according to an exemplary embodiment of the present invention.

FIG. 3 is a flowchart of a failed fuel management mode according to an exemplary embodiment of the present invention. The failed fuel management mode may be invoked after the plant has an indication through, for example, an off-gas monitoring system, that a fuel rod failure may have occurred. As shown in FIG. 3, the plant parameters and instrument (e.g., rods) are monitored in S310. Further, a subset of rods that is designated as having failed may also be selected for additional monitoring treatment in S320. Fuel rod parameters for all fuel rods are calculated in S330, assuming they are in the non-failed condition. Optionally, the rods designated as requiring failed fuel management are monitored additionally as failed fuel in S350, with subsequent calculation of failed fuel parameters as in S360. Parameters for both non-failed fuel and failed fuel are compared against respective fuel rod parameters in S340 and S370. The parameters for both non-failed and failed fuels are compared to the respective limits in S380. If any of these parameters are exceeded, the operator is notified in S390 so that a decision as to appropriate plant operating strategy, as in S395, may be made. If the plant operation does need modifying, then the operation may continue to S330 and re-calculate the fuel performance parameter.

It should be appreciated that information obtained through various means so as to be able to identify the fuel rod that has failed, such as the predictor mode of the present invention, power suppression test or off-gas coolant samples, may also be used to assign a time of failure to the fuel rod failure. This assessment of time of failure may be inputted to the system so that the monitoring of fuel rod parameters in the fuel failure model may include a complete history of the operating environments in which the rods are calculated, both in the failed and non-failed conditions.

As described above, the exemplary embodiments may calculate fuel rod parameters (e.g., stress) through fuel rod thermal-mechanical codes during a power maneuver. The calculated parameters may be inputted to a failure model that takes into account the parameters. Knowledge of the parameters and failure probabilities may enable developing strategies to minimize failures, which may result in reduced fuel rod failures and/or degradation of failed rods.

While the present invention has been particularly shown and described with reference to exemplary embodiments thereof, it should be understood by those of ordinary skill in the art that various changes in form and details may be made therein without departing from the spirit and scope of the invention as defined by the following claims.

What is claimed is:

1. A method for assessing failure of fuel rods, the method comprising:
   monitoring fuel rod operational conditions;
   calculating a plurality of fuel rod parameters from the fuel rod operational conditions, each of the fuel rod parameters reflecting a likelihood of failure of individual fuel rods;
   comparing each of the plurality of calculated fuel rod parameters to a corresponding parameter limit;
   modifying projected plant operational conditions, if at least one of the calculated fuel rod parameters exceeds the corresponding parameter limit, so as to reduce a degree to which the calculated fuel rod parameters exceed the corresponding parameter limit,
   receiving the modified, projected plant operational conditions from an operator if at least one of the calculated fuel rod parameters exceeds the corresponding parameter limit;
   repeating the calculating, comparing, and receiving steps, the calculating instead including calculating a plurality of fuel rod parameters from the modified, projected plant operational conditions and the fuel rod operational conditions if the at least one of the calculated fuel rod parameters exceeds the corresponding parameter limit; and
   modifying plant operation based on one of the projected plant operational conditions and the modified projected plant operational conditions.

2. The method according to claim 1, wherein monitoring the fuel operational conditions includes collecting data of the fuel rod operational conditions at a regular time interval.

3. The method according to claim 1, wherein monitoring fuel rod operational conditions is in real-time.

4. The method according to claim 3, wherein monitoring the fuel rod operational conditions includes collecting data of the fuel rod operational conditions from a system consisting of at least one of a plant computer, a core monitoring system, a computer that is not linked to the plant computer, and through an Internet.

5. The method according to claim 1, wherein monitoring the fuel rod operational conditions is automatically performed without an operator.

6. The method according to claim 1, wherein the plurality of fuel rod parameters are calculated from a real-time operational conditions.

7. The method according to claim 1, further comprising:
   notifying the operator if the at least one of the calculated fuel rod parameters exceeds the corresponding parameter limit.

8. The method according to claim 1, wherein the plurality of calculated fuel rod parameters include at least one of stress, internal gas pressure, temperature, deformation, release of fission product gases, fuel swelling and densification, cladding thermal expansion, and cladding corrosion.

* * * * *